US012711493B2

(12) United States Patent
Aravamudhan et al.

(10) Patent No.: US 12,711,493 B2
(45) Date of Patent: Aug. 18, 2026

(54) SYSTEMS AND METHODS FOR TOKEN VERSIONING AND REISSUE

(71) Applicant: JPMORGAN CHASE BANK, N.A., New York, NY (US)

(72) Inventors: Sridhar Aravamudhan, Middletown, DE (US); Howard Spector, Street, MD (US); David L Koch, Westerville, OH (US); Steve M Piatt, Dublin, OH (US); Valli Musti, Scarsdale, NY (US); Valerii Dmytryk, Woodinville, WA (US); Bharat B Sharma, Glasgow (GB); Neha Srivastava, SeaTac, WA (US); Gunjeet Singh, San Jose, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/084,237

(22) Filed: Mar. 19, 2025

(65) Prior Publication Data

US 2025/0299181 A1 Sep. 25, 2025

Related U.S. Application Data

(60) Provisional application No. 63/567,818, filed on Mar. 20, 2024.

(51) Int. Cl.
*G06Q 20/36* (2012.01)

(52) U.S. Cl.
CPC ..... *G06Q 20/3676* (2013.01); *G06Q 20/3678* (2013.01)

(58) Field of Classification Search
CPC .......... G06Q 20/3676; G06Q 20/3678; G06Q 20/3821; G06Q 20/385; G06Q 20/02
See application file for complete search history.

(56) References Cited

U.S. PATENT DOCUMENTS

2011/0154467 A1* 6/2011 Bomar .................. G06F 21/335 726/9
2013/0103685 A1* 4/2013 Preneel ................ G06Q 20/385 707/769

(Continued)

FOREIGN PATENT DOCUMENTS

WO WO-2023281451 A1 * 1/2023 ......... G06Q 20/3278
WO WO-2023011755 A1 * 2/2023 ............... H04L 9/50

*Primary Examiner* — Chunling Ding
(74) *Attorney, Agent, or Firm* — GREENBERG TRAURIG LLP

(57) ABSTRACT

A method may include a tokenization service: receiving, from a token management system, a namespace and a plurality of token parameters for the namespace; receiving a one-time load of a plurality of primary account numbers from the token management system; generating a token corresponding to each of the plurality of primary account numbers using the token parameters; storing a mapping of the plurality of tokens to the primary account numbers in the namespace; providing the plurality of tokens to the token management system; receiving, in response to a token refresh event, a new namespace and new token parameters from the token management system; generating a new token corresponding to each of the primary account numbers using the new token parameters; storing a mapping of the plurality of new tokens to the primary account numbers; and providing the plurality of new tokens to the token management system.

15 Claims, 3 Drawing Sheets

(56) References Cited

U.S. PATENT DOCUMENTS

| | | | | |
|---|---|---|---|---|
| 2014/0143146 | A1* | 5/2014 | Passanha | G06Q 20/385 705/44 |
| 2015/0254657 | A1* | 9/2015 | Bondesen | G06Q 20/405 705/44 |
| 2017/0109736 | A1 | 4/2017 | Heiman et al. | |
| 2017/0344756 | A1* | 11/2017 | Mattsson | G06F 16/90335 |
| 2018/0285864 | A1* | 10/2018 | Dill | G06Q 20/4016 |
| 2018/0349898 | A1* | 12/2018 | Ayikara Kizhakayil | G06Q 40/06 |
| 2019/0253255 | A1* | 8/2019 | Mani | H04L 9/3297 |
| 2020/0342453 | A1* | 10/2020 | Braundmeier | G06Q 20/385 |
| 2022/0027515 | A1* | 1/2022 | Rozenberg | G06F 21/6254 |
| 2022/0188781 | A1* | 6/2022 | El-Bizri | G06Q 20/3678 |
| 2023/0214818 | A1 | 7/2023 | Techel et al. | |
| 2025/0028852 | A1* | 1/2025 | Chowanski | G06F 21/6227 |
| 2025/0156856 | A1* | 5/2025 | Hupel | G06Q 20/36 |

* cited by examiner

SYSTEMS AND METHODS FOR TOKEN VERSIONING AND REISSUE

RELATED APPLICATIONS

This application claims priority to, and the benefit of, U.S. Provisional Patent Application Ser. No. 63/567,818, filed Mar. 20, 2024, the disclosure of which is hereby incorporated, by reference, in its entirety.

BACKGROUND OF THE INVENTION

1. Field of the Invention

Embodiments relate to systems and methods for token versioning and reissue.

2. Description of the Related Art

Tokens, such as those representing sensitive data, are generally mapped to a single instance of sensitive data. For example, a token may be mapped to a primary account number (PAN) for a credit card, debit card, etc. If multiple tokens were mapped to more than one token, interoperability issues and other conflicts could occur between the new and the old tokens.

SUMMARY OF THE INVENTION

Systems and methods for token versioning and reissue are disclosed. According to an embodiment, a method may include: (1) receiving, at a tokenization service and from a token management system, a namespace and a plurality of token parameters for the namespace; (2) receiving, at the tokenization service, a one-time load of a plurality of primary account numbers from the token management system; (3) generating, by the tokenization service, a token corresponding to each of the plurality of primary account numbers using the token parameters; (4) storing, by the tokenization service, a mapping of the plurality of tokens to the primary account numbers in the namespace; (5) providing, by the token management system, the plurality of tokens to the token management system; (6) receiving, by the token management system and in response to a token refresh event, a new namespace and new token parameters from the token management system; (7) generating, by the tokenization service, a new token corresponding to each of the primary account numbers using the new token parameters; (8) storing, by the tokenization service, a mapping of the plurality of new tokens to the primary account numbers; and (9) providing, by the tokenization service, the plurality of new tokens to the token management system.

In one embodiment, the namespace is stored in a token vault.

In one embodiment, the plurality of token parameters comprise a token length, a token format, and/or a token datatype.

In one embodiment, the token refresh event comprises a breach of the token vault.

In one embodiment, the token refresh event comprises changing the token parameters.

In one embodiment, the method may also include: deleting, by the tokenization service, the namespace after a period of time.

According to another embodiment, a system may include: a token management system; a tokenization service; a token vault; and a plurality of token consuming applications. The tokenization service receives, from the token management system, a namespace and a plurality of token parameters for the namespace; the token management system executes, for the tokenization service, a one-time load of a plurality of primary account numbers; the tokenization service generates a token corresponding to each of the plurality of primary account numbers using the token parameters; the tokenization service stores a mapping of the plurality of tokens to the primary account numbers in the namespace in the token vault; the token management system provides the plurality of tokens to the token management system; the token management system receives, and in response to a token refresh event, a new namespace and new token parameters from the token management system; the tokenization service generates a new token corresponding to each of the primary account numbers using the new token parameters; the tokenization service stores a mapping of the plurality of new tokens to the primary account numbers; and the tokenization service provides the plurality of new tokens to the token management system.

In one embodiment, the namespace is stored in a token vault.

In one embodiment, the plurality of token parameters comprise a token length, a token format, and/or a token datatype.

In one embodiment, the token refresh event comprises a breach of the token vault.

In one embodiment, the token refresh event comprises changing the token parameters.

In one embodiment, the tokenization service deletes the namespace after a period of time.

According to another embodiment, a non-transitory computer readable storage medium may include instructions stored thereon, which when read and executed by one or more computer processors, cause the one or more computer processors to perform steps comprising: receiving, from a token management system, a namespace and a plurality of token parameters for the namespace; receiving a one-time load of a plurality of primary account numbers from the token management system; generating a token corresponding to each of the plurality of primary account numbers using the token parameters; storing a mapping of the plurality of tokens to the primary account numbers in the namespace; providing the plurality of tokens to the token management system; receiving, in response to a token refresh event, a new namespace and new token parameters from the token management system; generating a new token corresponding to each of the primary account numbers using the new token parameters; storing a mapping of the plurality of new tokens to the primary account numbers; and providing the plurality of new tokens to the token management system.

In one embodiment, the namespace is stored in a token vault.

In one embodiment, the plurality of token parameters comprise a token length, a token format, and/or a token datatype.

In one embodiment, the token refresh event comprises a breach of the token vault.

In one embodiment, the token refresh event comprises changing the token parameters.

In one embodiment, the non-transitory computer readable storage medium may also include instructions stored thereon, which when read and executed by the one or more computer processors, cause the one or more computer processors to perform steps comprising: deleting the namespace after a period of time.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for token versioning and reissue are disclosed.

Embodiments may include a token versioning scheme with automated token refresh or replacement. For example, an old token format may be replaced with a new token format, and tokens using the old format may be replaced with tokens using the new format. In embodiments, tokens may be refreshed or replaced in response to a single card reissue (e.g., a new PAN and new token number may be generated), a card lost/stolen (e.g., a new PAN and token may be generated), a conversion (e.g., a new PAN may be created, so a new token may be created for the new PAN), a deconversion (e.g., in response to an action, the tokens may be purged), a mass reissue of PANs (when a new card number will be issued, a new token number will be added for each of the new card numbers), etc.

Examples of scenarios in which token reissue or replacement may be needed may include: when the PAN and token pairs are exposed to external party; credit card and token pairs are explicitly copied outside of the temporary vault to the internal systems; wherein there is a compromise of a data lake/mainframe in the interim state, in which both the PAN and token values reside; a compromise of a batch (tokenize and detokenize) while it is being sent to a batch interface; when the values are compromised when in transit due to a lack of end-to-end transport encryption; and when the vault that stores token and key pairs is compromised.

Embodiments may use namespaces for different token versions. A namespace is a physical data isolation layer that segments tokens of a specific type from tokens of a different type. Thus, each token type may receive the maximum number of tokens in each namespace.

In another embodiment, the namespace may be a logical boundary for tokens for a specific token management system, such as a version of tokens.

In one embodiment, each namespace may define certain parameters for the tokens associated therewith, such as the token length, token format, token datatype (e.g., numeric, alphabetic, alphanumeric, etc.), etc.

In embodiment, as part of a token refresh or reissue, a new namespace may be created, and the new tokens may be associated with the new namespace.

Figure 1:
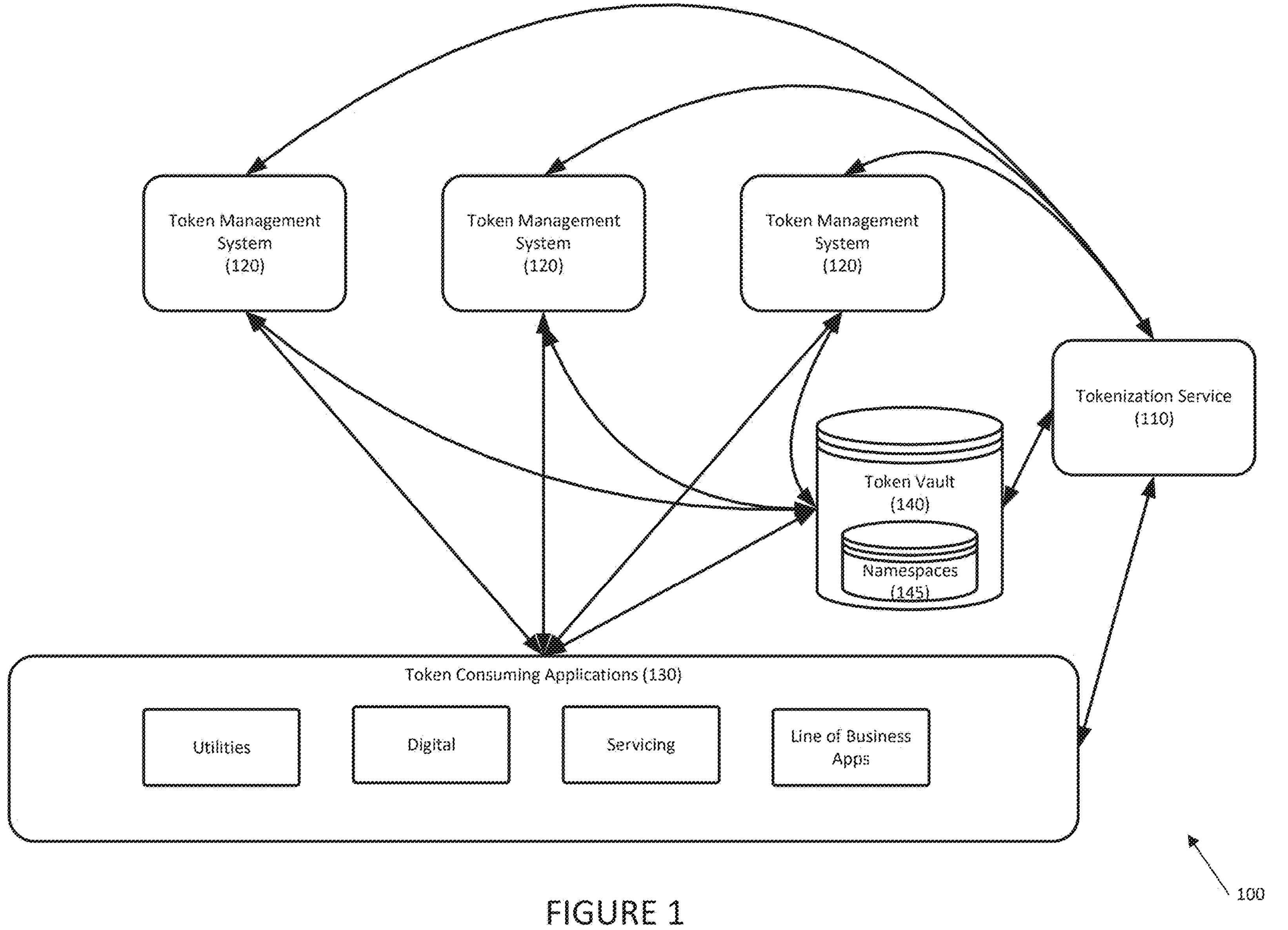
FIG. 1 depicts a system for token versioning and reissue according to an embodiment.

Referring to FIG. 1, a system and method for reissuing tokens is disclosed according to an embodiment. System 100 may include tokenization service 110 that may tokenize PANs for one or more token requestors, such as token management systems 120. It should be noted that although FIG. 1 depicts one token management system 120, additional or fewer token management systems may be provided as is necessary and/or desired. Each token management systems 120 may specify parameters for the tokens that it requests.

An example of tokenization service 110 is described in U.S. patent application Ser. No. 18/527,074, the disclosure of which is hereby incorporated, by reference, in its entirety.

System 100 may further include token consuming applications 130, that may include any upstream or downstream applications/services that may receive and consume tokens. Examples may include utilities, digital applications, servicing applications, line of business applications, etc. Token consuming applications typically use Lookup or Detokenization API endpoints to translate previously tokenized data from value-to-token or token-to-value within a namespace.

System 100 may also include token vault 140, which may include one or more namespaces 145. Each namespace 145 may store tokens for that namespace generated by tokenization service. Token management system 120 and token consuming applications 130 may interact with token vault 140 via, for example, application programming interfaces (APIs).

In one embodiment, each token management system 120 may have access to one namespace 145 for its tokens.

Figure 2:
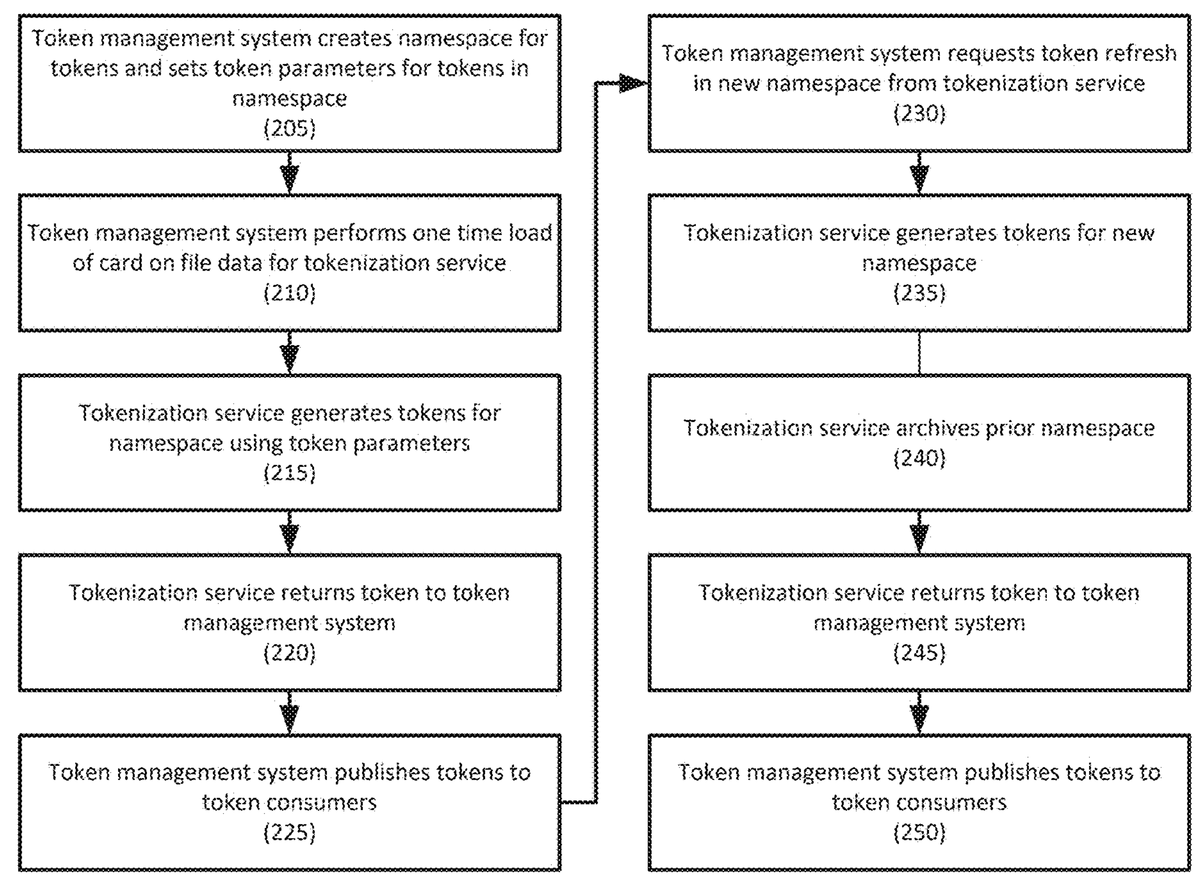
FIG. 2 depicts a method for token versioning and reissue according to an embodiment.

Referring to FIG. 2, a method for token versioning and reissue is provided according to an embodiment.

In step 205, a token requestor, such as a token management system, may create or request the creation of a namespace for a plurality of tokens for PANs. In one embodiment, the token management system may set token parameters for the tokens in the namespace, such as a token length, token format, token data type, etc.

In step 210, the token management system may perform a one-time load of card on file data for the tokenization service. For example, the token management system may provide the PANs for the cards that the tokenization service is to tokenize.

In step 215, the tokenization service may generate tokens for the PANs in the namespace using the token parameters provided by the token management system.

If the token management system did not create the namespace, the tokenization service may create the namespace before generating the tokens.

The tokenization service may maintain the mapping of tokens to the PANs.

In step 220, the tokenization service may return the tokens for the namespace to the token management system.

In step 225, the token management system may receive the tokens for the namespace and may publish the tokens to the consumers. The token consumers, which may be upstream or downstream systems, may consume the tokens in a business as usual fashion.

In step 230, in response to a token refresh event, the token management system may request a token refresh in new namespace from the tokenization service. In one embodiment, the token management system may provide updated parameters for the tokens, and may identify the namespace that is to be refreshed.

In one embodiment, if all tokens in the namespace are not being refreshed, the token management system may identify the tokens that are not being refreshed, and/or may identify the tokens that are being refreshed.

In one embodiment, the token management system may create the new namespace.

Examples of token refresh events include changing the token format, periodic token refresh, generating a copy of the token vault, responding to a breach of the token vault, etc.

In step 235, the tokenization service may generate new tokens for the new namespace using updated token parameters provided by the token management system.

If the token management system did not create the new namespace, the tokenization service may create the new namespace before generating the new tokens.

In step 240, the tokenization service may archive the previous namespace. This is to provide a transition period in which the old token may still be used by a consumer. For example, if a consumer provides the old token with a token lookup or token retrieval event, the tokenization service may return the mapped PAN and the new token to the consumer.

The prior namespace may be deleted after a period of time, or it may be maintained indefinitely.

In step 245, the tokenization service may return the new namespace with the tokens to the token management system.

In step 250, the token management system may publish the tokens to the token consumers. The token consumers may consume the tokens in a business as usual fashion.

Figure 3:
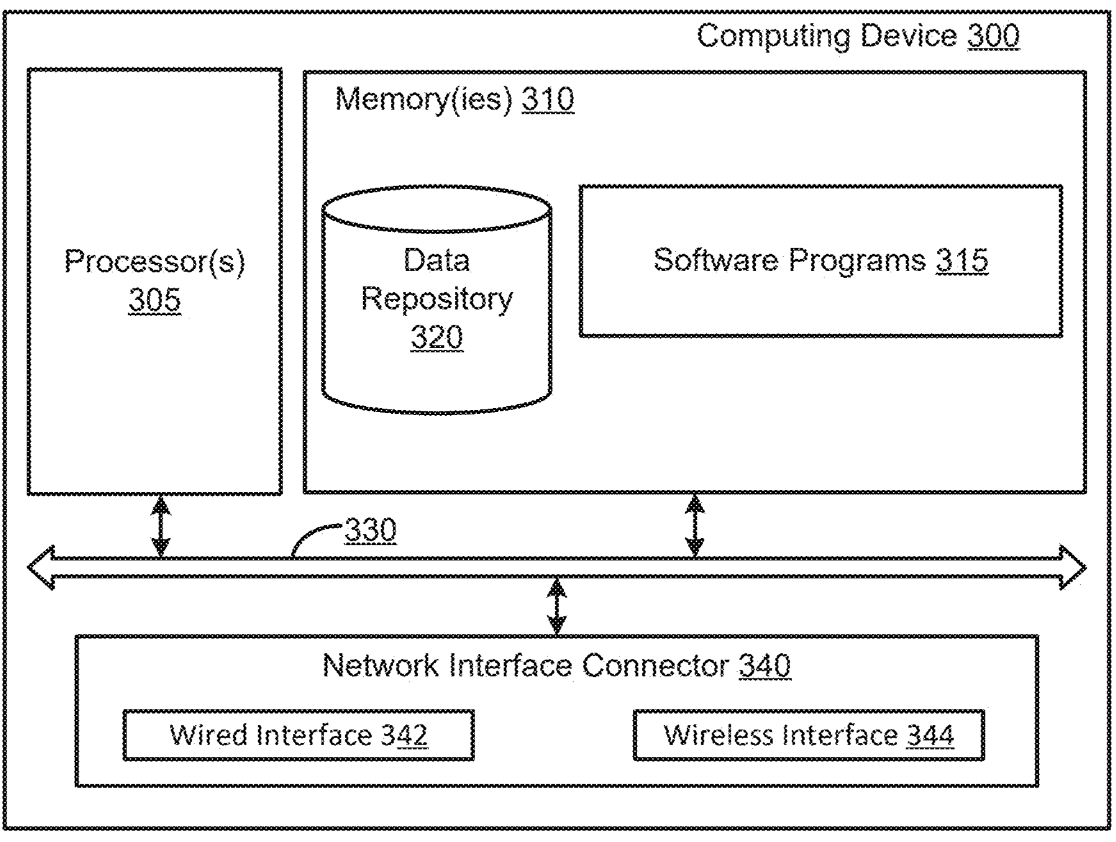
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, at a tokenization service and from a token management system, a namespace and a plurality of token parameters for the namespace;

receiving, at the tokenization service, a one-time load of a plurality of primary account numbers from the token management system;

generating, by the tokenization service, a token corresponding to each of the plurality of primary account numbers using the token parameters;

storing, by the tokenization service, a mapping of a plurality of tokens to the primary account numbers in the namespace in a token vault, wherein the namespace comprises a first physical data isolation layer;

providing, by the tokenization service, the plurality of tokens to the token management system;

receiving, by the tokenization service and in response to a token refresh event, a new namespace and new token parameters from the token management system;

generating, by the tokenization service, a new token corresponding to each of the primary account numbers using the new token parameters;

storing, by the tokenization service, a mapping of a plurality of new tokens to the primary account numbers in the new namespace in the token vault, wherein the new namespace comprises a second physical data isolation layer and segments the plurality of new tokens in the new namespace from the plurality of tokens in the namespace; and providing, by the tokenization service, the plurality of new tokens to the token management system.

2. The method of claim 1, wherein the plurality of token parameters comprise a token length, a token format, and/or a token datatype.

3. The method of claim 1, wherein the token refresh event comprises a breach of the token vault.

4. The method of claim 1, wherein the token refresh event comprises changing the token parameters.

5. The method of claim 1, further comprising: deleting, by the tokenization service, the namespace after a period of time.

6. A system, comprising:

one or more computer processors;

one or more memories storing instructions comprising a tokenization service application and a plurality of token consuming applications; and a token vault;

wherein the one or more computer processors execute the tokenization service application to:

receive, from a token management system, a namespace and a plurality of token parameters for the namespace;

receive a one-time load of a plurality of primary account numbers from the token management system;

generate a token corresponding to each of the plurality of primary account numbers using the token parameters;

store a mapping of a plurality of tokens to the primary account numbers in the namespace in the token vault, wherein the namespace comprises a first physical data isolation layer;

provide the plurality of tokens to the token management system;

receive, and in response to a token refresh event, a new namespace and new token parameters from the token management system;

generate a new token corresponding to each of the primary account numbers using the new token parameters;

store a mapping of a plurality of new tokens to the primary account numbers in the new namespace in the token vault, wherein the new namespace comprises a second physical data isolation layer and segments the plurality of new tokens in the new namespace from the plurality of tokens in the namespace; and provide the plurality of new tokens to the token management system.

7. The system of claim 6, wherein the plurality of token parameters comprise a token length, a token format, and/or a token datatype.

8. The system of claim 7, wherein the token refresh event comprises a breach of the token vault.

9. The system of claim 6, wherein the token refresh event comprises changing the token parameters.

10. The system of claim 6, wherein the one or more computer processors execute the tokenization service application to delete the namespace after a period of time.

11. A non-transitory computer readable storage medium, including instructions stored thereon, which when read and executed by one or more computer processors, cause the one or more computer processors to perform steps comprising:

receiving, from a token management system, a namespace and a plurality of token parameters for the namespace;

receiving a one-time load of a plurality of primary account numbers from the token management system;

generating a token corresponding to each of the plurality of primary account numbers using the token parameters;

storing a mapping of a plurality of tokens to the primary account numbers in the namespace in a token vault, wherein the namespace comprises a first physical data isolation layer;

providing the plurality of tokens to the token management system;

receiving, in response to a token refresh event, a new namespace and new token parameters from the token management system;

generating a new token corresponding to each of the primary account numbers using the new token parameters;

storing a mapping of a plurality of new tokens to the primary account numbers in the new namespace in the token vault, wherein the new namespace comprises a second physical data isolation layer and segments the plurality of new tokens in the new namespace from the plurality of tokens in the namespace; and providing the plurality of new tokens to the token management system.

12. The non-transitory computer readable storage medium of claim 11, wherein the plurality of token parameters comprise a token length, a token format, and/or a token datatype.

13. The non-transitory computer readable storage medium of claim 12, wherein the token refresh event comprises a breach of the token vault.

14. The non-transitory computer readable storage medium of claim 11, wherein the token refresh event comprises changing the token parameters.

15. The non-transitory computer readable storage medium of claim 11, further including instructions stored thereon, which when read and executed by the one or more computer processors, cause the one or more computer processors to perform steps comprising:

deleting the namespace after a period of time.

* * * * *